No. 856,563. PATENTED JUNE 11, 1907.
V. G. APPLE.
FRICTION DEVICE.
APPLICATION FILED APR. 3, 1907.

Witnesses.

Inventor.
Vincent G. Apple
by Jas. H. Churchill
atty.

UNITED STATES PATENT OFFICE.

VINCENT G. APPLE, OF DAYTON, OHIO, ASSIGNOR TO NATIONAL BRAKE AND CLUTCH COMPANY, OF BOSTON, MASSACHUSETTS, A CORPORATION.

FRICTION DEVICE.

No. 856,563.   Specification of Letters Patent.   Patented June 11, 1907.

Application filed April 3, 1907. Serial No. 366,167.

*To all whom it may concern:*

Be it known that I, VINCENT G. APPLE, a citizen of the United States, residing in Dayton, in the county of Montgomery and State of Ohio, have invented an Improvement in Friction Devices, of which the following description, in connection with the accompanying drawings, is a specification, like letters on the drawings representing like parts.

This invention relates to a friction device employing cork as the friction surface and is herein shown as embodied in a pulley, and has for its object to provide a device of the character specified, which is of increased efficiency and durability and which may be produced at a minimum expense. For this purpose the driving surface of the pulley is composed of compressed cork located between washers or reinforcing members of substantially flexible, non-metallic material, preferably leather, which are engaged by end disks or plates of rigid material, preferably metal, firmly secured together as by rivets extended through the interposed compressed cork.

The cork portion of the pulley is preferably made of a plurality of layers or sections, which are arranged side by side between the re-inforcing members or washers of leather, and the latter are made of substantially the same size as that of the cork sections, so that when the cork sections are subjected to compression between the metal side or end plates, they are substantially uniformly compressed for substantially their full diameter, thereby obtaining a firm and durable wearing surface for the pulley and avoiding waste of cork, as will be described.

These and other features of this invention will be pointed out in the claims at the end of this specification.

Figure 1:
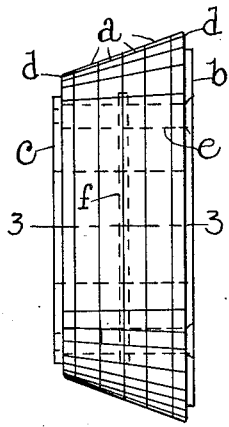
Figure 2:
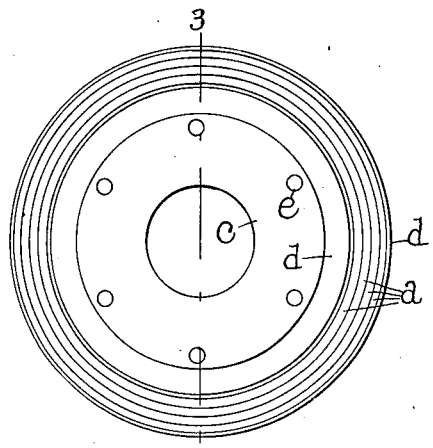
Figure 3:
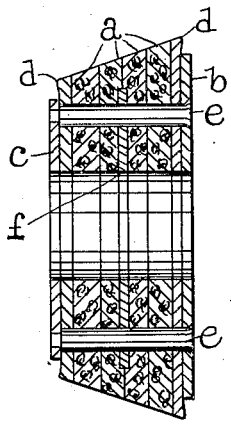

Figure 1 is an elevation of a pulley embodying this invention. Fig. 2, a side elevation looking toward the right in Fig. 1. Fig. 3, a section on the line 3—3, Fig. 2, and Fig. 4, a sectional view to illustrate the advantages of the present invention.

In the present instance, the invention is shown in a cone pulley comprising as herein shown four disks or layers $a$ of cork assembled together in a highly compressed condition. The compressed cork layers $a$ are confined between retaining end disks or plates $b$, $c$, of metal or other rigid material, which engage and bear against protecting or re-inforcing layers or washers $d$ of flexible material, preferably sole leather, which are interposed between said metal disks and the outside or end layers or sections of cork. The metal plates or disks $b$, $c$ may be secured together by rivets $e$ or in any other suitable manner.

I may prefer to provide the pulley with one or metal disks $f$ interposed between adjacent cork disks, which serves to prevent the rivets buckling and also serves to strengthen the pulley.

In the manufacture of the pulley herein shown, the parts except the rivets are assembled together, and subjected to considerable pressure so as to highly compress the cork layers or disks $a$ and thereby impart to the pulley a compact, tenacious and durable periphery of cork, with which an increased friction may be obtained, which renders the pulley especially adapted for driving purposes.

The cork sections in their natural state and before compression are materially wider than in the finished pulley, and in practice I prefer to compress them to about one fourth of their original width.

In order to effect a material saving in cork and obtain a superior pulley having a wearing surface of increased depth, the outside or endmost layers or disks of cork are engaged by the layers or washers $d$ of leather or other like fibrous or non-metallic material, which project beyond the circumferential edge of the metal disks or plates $b$, $c$, and serve to transmit the compressing action of the rigid disks $b$, $c$ to substantially the circumference of the cork sections, so that the latter are compressed in a substantially uniform manner throughout their full diameter, while at the same time the edge of the leather washers do not materially diminish the friction surface of the pulley and wear away with the cork in a substantially uniform manner.

Figure 4:
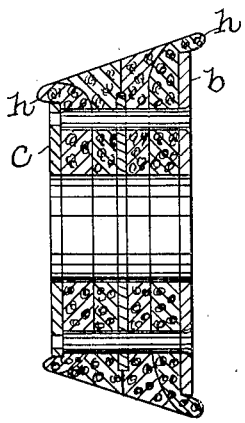

By means of the non-metallic washers $d$, the portion of the intermediate cork layers near their circumference are compressed substantially the same amount as the central portion of the cork layers, which results in obtaining a firmer and more durable cork wearing surface and also effects a material saving in cork over a pulley made without the non-metallic washers as represented in Fig. 4, wherein it will be seen that the circumferential portion of the outside cork layers overlap or project beyond the metal disks or plates as at *h*, which require subsequent trimming off of a material quantity of cork, and that the circumferential portions of the intermediate cork layers are compressed to a less degree than their central portions, thereby leaving the periphery of the pulley softer than the compressed central portion and less durable. So also the edges of the outside cork layers are unsupported and liable to be broken or chipped off in use, thereby diminishing the efficiency and life of the pulley. These objectionable features are avoided in accordance with the present invention by the supporting ends of the non-metallic washers *d*.

I have herein described the friction device as a cone pulley, but I do not desire to limit my invention in this respect, as other forms of friction devices, such as circular pulleys, brakes, clutches, etc. may be made after the manner herein shown. So also I may prefer to make the supporting washers or pieces *d* of leather, such as sole leather, but I do not desire to limit my invention in this respect, as any other material which will wear substantially uniformly with the cork and possess sufficient firmness to compress the edges of the cork sections may be used.

Claims.

1. As an improved article of manufacture, a composite pulley having metallic side pieces, an intermediate portion of compressed cork projecting beyond the edge of the metallic side pieces, and non-metallic pieces interposed between the metallic side pieces and the cork and extended beyond said metallic side pieces, and means to secure said metallic pieces together, substantially as described.

2. As an improved article of manufacture, a composite pulley having side pieces of rigid material, and a rigid piece intermediate said side pieces, a compressed cork portion between said rigid piece and said side pieces and projecting beyond the latter, non-metallic pieces interposed between said side pieces and said cork portion and supporting the latter beyond the said side pieces, substantially as described.

3. As an improved article of manufacture, a composite friction device having side pieces of rigid material, a compressed cork portion between said side pieces and projecting beyond the same, and non-metallic supporting pieces for the projecting portions of said cork interposed between the same and said side pieces.

4. As an improved article of manufacture, a composite friction device having side pieces of rigid material, a compressed cork portion between said side pieces and projecting beyond the same, and pieces of firm leather interposed between said cork portion and said side pieces and projecting beyond said side pieces to re-inforce or support the projecting cork portion, substantially as described.

In testimony whereof, I have signed my name to this specification in the presence of two subscribing witnesses.

VINCENT G. APPLE.

Witnesses:
BESSIE B. APPLE,
I. WARNER.